(No Model.)
C. L. COFFIN.
METHOD OF WELDING BY ELECTRICITY.
No. 419,032. Patented Jan. 7, 1890.
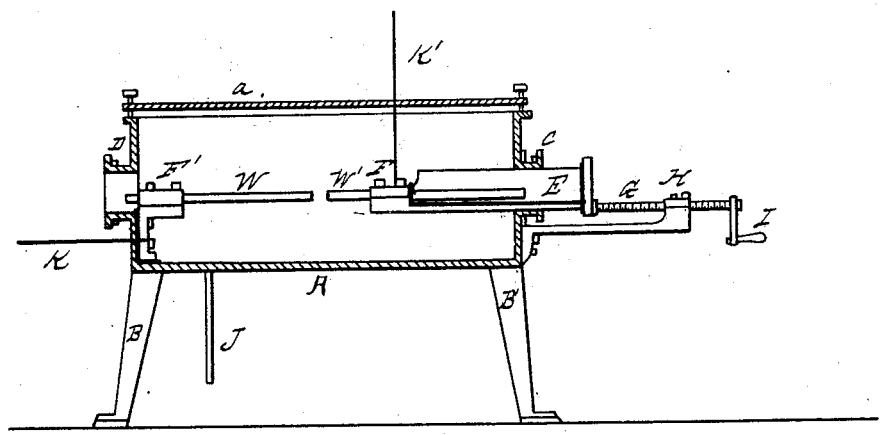
Witnesses
Cyrus E. Lothrop
Adelaide A. Anderson
Inventor
Charles L. Coffin

UNITED STATES PATENT OFFICE.

CHARLES L. COFFIN, OF DETROIT, MICHIGAN.

METHOD OF WELDING BY ELECTRICITY.

SPECIFICATION forming part of Letters Patent No. 419,032, dated January 7, 1890.

Application filed June 25, 1889. Serial No. 315,507. (No model.)

*To all whom it may concern:*

Be it known that I, CHARLES L. COFFIN, of Detroit, in the county of Wayne and State of Michigan, have invented a new and useful Improvement in Welding Metals Electrically, of which the following is a specification.

My invention relates to welding metals electrically; and it consists in performing the welding operation in a non-oxidizing medium.

The drawing is a vertical section of an apparatus which may be used to practice my invention in one of the known modes—viz., that one consisting in heating the articles to be welded by passing a current through them and pressing them together.

A represents a box supported on legs B and having a tight-fitting cover $a$, which may be bolted thereto.

C represents a stuffing-box, through which slides a tight box E, carrying on its end a clamp F, insulated from the box E to hold one of the articles W' to be welded.

F' represents a clamp secured at one end of box A and insulated therefrom to hold the other article W to be welded.

D represents a man-hole provided with a tight-fitting cover, through which the article W may be passed into the box A.

K' and K represent electrical conductors, which connect the poles of an electrical generator with the clamps F and F'.

H represents a bracket secured to the end of box A, having thereon a screw-nut, in which meshes a screw G, provided with a crank I, by which the box E may be moved in either direction.

J represents a pipe connected with box A, by which said box may be exhausted of air and then filled with some non-oxidizing medium. Any non-oxidizing medium may be employed—such as hydrogen gas, nitrogen, hydrocarbon gas, solution of caustic alkali, &c.—including any medium which retards the formation of oxides and scale upon and within the metal which is being welded. This medium may be used under pressure or under ordinary atmospheric pressure or rarefied. If a liquid medium be used, the cover $a$ is of course unnecessary, the box A being filled with the liquid, so as to submerge the articles to be welded.

The process of welding is in itself well known and requires no description.

What I claim as my invention, and desire to secure by Letters Patent, is—

The process herein described of welding, which consists in electrically welding metals together in a non-oxidizing medium.

CHARLES L. COFFIN.

Witnesses:
CYRUS E. LOTHROP,
ADELAIDE A. ANDERSON.